(12) United States Patent
Donderer

(10) Patent No.: US 7,429,002 B2
(45) Date of Patent: Sep. 30, 2008

(54) ELECTRICAL DEVICE WITH STORED DATA

(75) Inventor: Markus Donderer, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/598,163

(22) Filed: Nov. 9, 2006

(65) Prior Publication Data
US 2007/0108299 A1    May 17, 2007

(30) Foreign Application Priority Data
Nov. 11, 2005    (EP) ................................. 05024744

(51) Int. Cl.
*G06K 19/06*    (2006.01)

(52) U.S. Cl. ................ 235/492; 365/105; 365/191; 365/192

(58) Field of Classification Search ............... 235/492; 365/105, 191, 192
See application file for complete search history.

(56) References Cited

U.S. PATENT DOCUMENTS

| 5,528,222 | A | 6/1996 | Moskowitz et al. | |
| 7,145,458 | B2 * | 12/2006 | Hashimoto et al. | 340/572.1 |
| 7,150,407 | B1 * | 12/2006 | Berger et al. | 235/492 |
| 7,158,401 | B2 * | 1/2007 | Bhattacharyya | 365/149 |
| 2005/0133605 | A1 * | 6/2005 | Koyama et al. | 235/492 |
| 2005/0134435 | A1 * | 6/2005 | Koyama et al. | 340/10.34 |
| 2005/0280511 | A1 * | 12/2005 | Yokoyama et al. | 340/10.5 |
| 2006/0131393 | A1 * | 6/2006 | Cok et al. | 235/380 |

FOREIGN PATENT DOCUMENTS

| CN | 1118910 A | 3/1996 |
| DE | 198 09 075 A1 | 9/1999 |
| EP | 1 291 745 A2 | 3/2003 |

OTHER PUBLICATIONS

D.S. Zinger, H.R. Liggett, V. Difatta; "Incorporating Radio Frequency Communication into a Computer Integrated Manufacturing Test Facility"; Industry Applications Conference 1995; Thirtieth IAS Annual Meeting, IAS '95; Conference Record of the 1995 IEEE Orlando, FL, USA; Oct. 8-12, 1995; pp. 1874-1878; IEEE, New York NY, USA.

* cited by examiner

*Primary Examiner*—Uyen-Chau N. Le
*Assistant Examiner*—Tuyen K Vo

(57) ABSTRACT

The invention relates to an electrical device with a logic circuit and with a storage medium which is connected to the logic circuit and in which data are stored. The storage medium is provided with a data link via which data can be read out outside the device with the aid of a reader. The storage medium can also be a RFID transponder to provide data via radio link to be read by a reader outside of the device.

8 Claims, 1 Drawing Sheet

ELECTRICAL DEVICE WITH STORED DATA

CROSS REFERENCE TO RELATED APPLICATIONS

This application claims priority of European Application No. 05024744.4 filed Nov. 11, 2005, which is incorporated by reference herein in its entirety.

FIELD OF THE INVENTION

The invention relates to an electrical device with a logic circuit and with a storage medium which is electrically connected to the logic circuit and in which data are stored.

BACKGROUND OF THE INVENTION

Devices of this type are known, a station name being assigned to them for addressing purposes. Following the configuration this station name is stored in the storage medium of the device by means of an engineering tool. Furthermore, in automation devices a so-called name plate and maintenance information can be stored as data. If the automation device is exchanged as a result of a defect being discovered during service, the new automation device initially has no or generally not the right data stored. Generally it is no longer possible for the user to read out the required data from the defective device. In the event of a missing or incorrect station name, the device will not start up without the aid of a programming device and the engineering tool. To overcome this problem, up until now it has been common to use an exchangeable medium (e.g. a multimedia card or C plug). The storage medium containing the station name is removed from the defective device and inserted into the new device.

However, an exchangeable storage medium increases the manufacturing costs since additional plug-in connectors, an additional module bay and possibly an additional printed circuit board and a storage medium with a housing are required. The customer must purchase such a storage medium for each device.

SUMMARY OF INVENTION

Hence, the object of the invention is to improve an electrical device of the abovementioned type in such a way as to allow easy access to the data in the storage medium while keeping costs at a minimum.

This object is achieved in that the storage medium is provided with a data link via which data can be read out outside the device with the aid of a reader.

An advantageous development of the invention exists when the data link has an interface which is accessible outside the device and serves to connect the reader.

It is also particularly advantageous when the storage medium provided with a data link is implemented as an RFID transponder from which stored data can be read out by means of a reader via a radio link.

BRIEF DESCRIPTION OF THE DRAWING

Two exemplary embodiments of the invention will be explained in more detail below with the aid of the drawing.

DETAILED DESCRIPTION OF THE DRAWING

Figure 1:
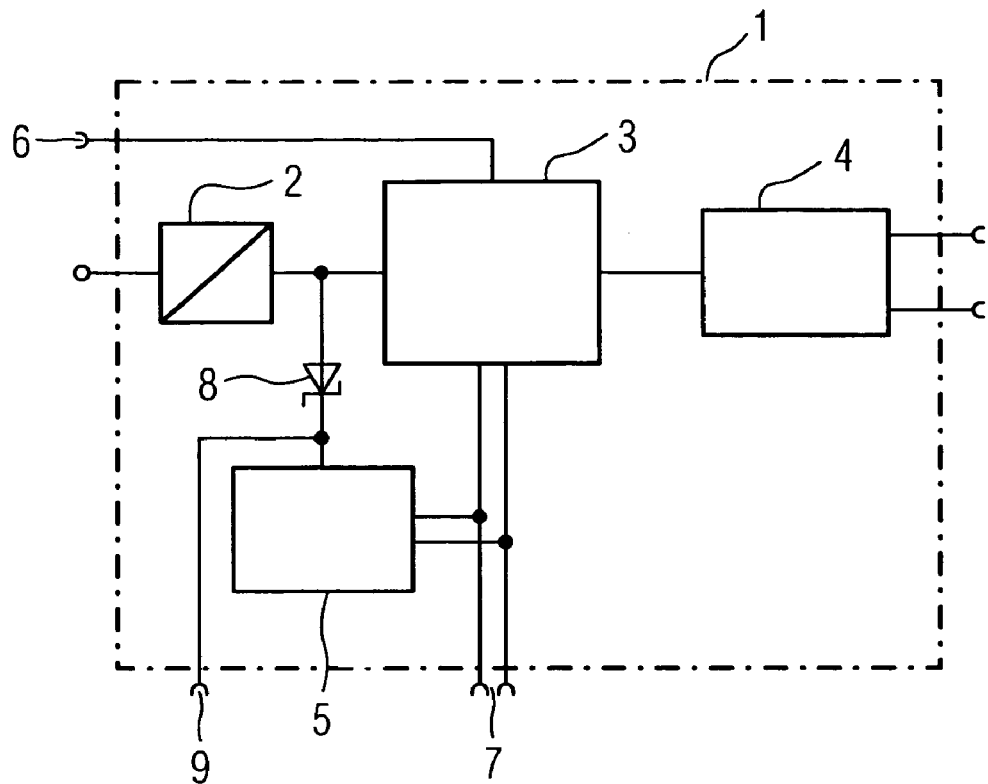
FIG. 1 shows an electrical device according to the invention with a storage medium which can be read out from outside and FIG. 2 shows an electrical device according to the invention with an RFID transponder as the storage medium.

FIG. 1 shows an electrical device 1 having a current transducer 2, a logic circuit 3 connected thereto, a peripheral unit 4 and a storage medium 5. The logic circuit 3 is connected to a bus connector 6, the DC transducer 2, the peripheral unit 4 and the storage medium 5. The latter link between the logic circuit and the storage medium 5 is brought out to an interface 7 which is accessible from outside the device 1. The storage medium 5, which can be implemented for example as a serial read-only memory, is connected via a diode to the output of the current transducer 2. There is a branch from this link to a supply connector 9 also accessible from outside.

When a defect occurs in the current transducer 2, the logic circuit 3 or the peripheral unit 4, the device is removed from the system and is disconnected from all the cabling. A reader can be connected via terminals 7 and 9 via which the storage medium 5 is supplied with power and at the same time the data in the storage medium 5 are read out. The information read out can then be transferred to a new device.

In normal operation, i.e. when the reader is not connected, the storage medium 5 is supplied with power via the coupling diode 8. The logic circuit 3 of the device writes the station name to the storage medium 5 in the conventional manner or the station name can be read out.

If a defect occurs, the reader is connected. It is ensured via diode 8 that only the storage medium is supplied with voltage and not the rest of the circuit. The data in the storage medium 5 can be read out to the reader via interface 7.

The solution described above employing a reader can be used for many similar devices in order to read out data. There is a considerable cost saving compared with the use of an exchangeable storage medium and in the case of a device with a high protection rating no additional, closeable opening for an exchangeable removable medium needs to be created. Depending upon the type of storage medium 5 used, only 1 to 3 additional pins are required.

Figure 2:
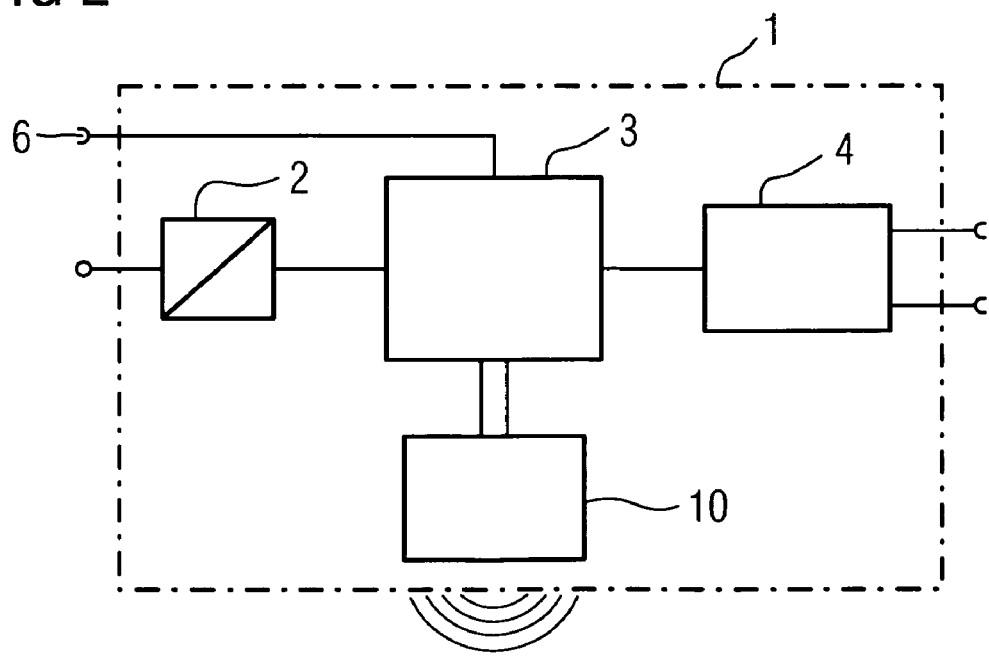

A further variant is shown in FIG. 2 whereby in contrast to the above exemplary embodiment, simply a different storage medium is used. In this case the storage medium provided with a data link is embodied as an RFID transponder 10 from which stored data can be read out by means of a reader not illustrated here via a radio link in the known art. All the other reference characters in FIG. 2 have the same significance as those already set out above in the description relating to FIG. 1.

The invention claimed is:

1. An electrical device comprising:
   a direct current transducer having an input and an output, wherein the input is electrically connectable from outside the electrical device;
   a logic circuit electrically connected to the direct current transducer;
   a bus connector electrically connected to the logic circuit;
   a storage medium electrically connected to the logic circuit via a data link, wherein the data link is electrically connected to an interface accessible from outside the electrical device, wherein the storage medium is electrically connected via a diode to the output of the direct current transducer; and wherein the storage medium comprises, data storage means, and the data link provides data to be read out with the aid of a reader outside the electrical device; and
   a branch from the electrical connection between the diode and the storage medium to a power supply connector accessible from outside the electrical device.

2. The electrical device according to claim 1, wherein the storage medium comprises, a serial read-only memory.

3. The electrical device according to claim 1, wherein the storage medium having a data link comprises, a RFID transponder having means for providing data via radio link to be read outside of the device by the reader via radio link.

4. The electrical device according to claim 1, wherein a station name is assigned to the electrical device for addressing purposes, and wherein the station name is stored in the storage medium.

5. The electrical device according to claim 4, wherein the electrical device is an automation device, wherein name plate data and maintenance information are stored in the storage medium.

6. A method for handling a defect of an automation device, comprising:

providing the automation device, wherein the automation device has;

a current transducer;

a logic circuit electrically connected to the current transducer;

a bus connector electrically connected to the logic circuit;

a peripheral unit electrically connected to the logic circuit;

a storage medium electrically connected to the logic circuit via a link, wherein the link is electrically connected to an interface accessible from outside the automation device, wherein the storage medium is electrically connected via a diode to an output of the current transducer, and wherein the storage medium comprises, data storage means, and a data link having means for providing data to be read out with the aid of a reader outside the automation device; and a branch from the electrical connection between the diode and the storage medium to a supply connector accessible from outside the automation device;

removing the automation device from a system by disconnecting the automation device from all cabling, when a defect occurs in the current transducer, the logic circuit or the peripheral unit;

connecting the reader via interfaces accessible from outside the automation device to the storage medium;

supplying the storage medium with power via the reader;

reading out the storage medium via the reader.

7. The method according to claim 6, wherein information read out is transferred to a new automation device.

8. The method according to claim 7, wherein the information is a station name for addressing purposes assigned to the defect automation device.

\* \* \* \* \*